United States Patent
Ikeda et al.

(10) Patent No.: US 8,327,295 B2
(45) Date of Patent: Dec. 4, 2012

(54) INFORMATION PROCESSING APPARATUS AND METHOD FOR DISPLAYING AUXILIARY INFORMATION

(75) Inventors: Tetsuo Ikeda, Tokyo (JP); Ken Miyashita, Tokyo (JP); Tatsushi Nashida, Kanagawa (JP); Kouichi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 624 days.

(21) Appl. No.: 12/494,634

(22) Filed: Jun. 30, 2009

(65) Prior Publication Data

US 2010/0005428 A1   Jan. 7, 2010

(30) Foreign Application Priority Data

Jul. 1, 2008   (JP) ................................ P2008-172407

(51) Int. Cl.
*G06F 3/033* (2006.01)
(52) U.S. Cl. .............. 715/863; 32/179; 32/185; 32/187; 32/197
(58) Field of Classification Search .................. 715/863; 382/179, 185, 186, 187, 197
See application file for complete search history.

(56) References Cited

U.S. PATENT DOCUMENTS

| | | | | |
|---|---|---|---|---|
| 5,781,663 A | * | 7/1998 | Sakaguchi et al. | 382/189 |
| 5,933,149 A | * | 8/1999 | Mori et al. | 345/442 |
| 6,334,003 B1 | * | 12/2001 | Yokota | 382/313 |
| 6,415,256 B1 | * | 7/2002 | Ditzik | 704/231 |
| 6,647,145 B1 | * | 11/2003 | Gay | 382/187 |
| 6,681,044 B1 | * | 1/2004 | Ma et al. | 382/185 |
| 6,694,056 B1 | * | 2/2004 | Ito et al. | 382/186 |
| 7,983,478 B2 | * | 7/2011 | Liu et al. | 382/161 |
| 2002/0168107 A1 | * | 11/2002 | Tang et al. | 382/187 |
| 2003/0048948 A1 | * | 3/2003 | Confer et al. | 382/197 |
| 2003/0059115 A1 | * | 3/2003 | Nakagawa | 382/197 |
| 2003/0064686 A1 | * | 4/2003 | Thomason et al. | 455/90 |
| 2005/0100214 A1 | * | 5/2005 | Zhang et al. | 382/179 |
| 2005/0271279 A1 | * | 12/2005 | Fujimura et al. | 382/203 |
| 2006/0017702 A1 | * | 1/2006 | Shen | 345/173 |
| 2006/0050962 A1 | * | 3/2006 | Geiger et al. | 382/186 |
| 2008/0049986 A1 | * | 2/2008 | Arai | 382/119 |

(Continued)

FOREIGN PATENT DOCUMENTS

| | | |
|---|---|---|
| JP | 6-242885 | 9/1994 |
| JP | 2005-339420 | 12/2005 |
| JP | 2006-331210 | 12/2006 |
| WO | WO 2006/022668 A1 | 3/2006 |

OTHER PUBLICATIONS

European Search Report issued Sep. 17, 2010, in The Hague, in European Patent Application No. 09 25 1450.

*Primary Examiner* — Ba Huynh
(74) *Attorney, Agent, or Firm* — Finnegan Henderson Farabow Garrett & Dunner LLP

(57) ABSTRACT

There is provided an information processing apparatus, including a direction detection unit that detects a drawing direction of a locus drawn in an input process of a gesture when the gesture is input, a gesture search unit that searches for the gesture matching the drawing direction of the locus detected by the direction detection unit from among a plurality of predetermined gestures, and an auxiliary information display unit that displays a search result by the gesture search unit in a screen as auxiliary information each time the drawing direction of the locus is detected by the direction detection unit.

6 Claims, 9 Drawing Sheets

U.S. PATENT DOCUMENTS

| | | |
|---|---|---|
| 2008/0111710 A1 | 5/2008 | Boillot |
| 2008/0192005 A1* | 8/2008 | Elgoyhen et al. .............. 345/158 |
| 2008/0260252 A1* | 10/2008 | Borgaonkar et al. ......... 382/189 |
| 2008/0284620 A1* | 11/2008 | Olsson et al. ................... 341/22 |
| 2009/0100383 A1 | 4/2009 | Sunday et al. |
| 2009/0208107 A1* | 8/2009 | Suwa et al. ................... 382/187 |
| 2011/0041100 A1* | 2/2011 | Boillot .......................... 715/863 |
| 2011/0229038 A1* | 9/2011 | Zou et al. ...................... 382/185 |

* cited by examiner

FIG.2

GESTURE SETTING EXAMPLES

| FUNCTION | | GESTURE |
|---|---|---|
| BACK IN HISTORY | > | LEFT |
| FORWARD IN HISTORY | > | RIGHT |
| REREAD DOCUMENT | > | UP-DOWN |
| REREAD DOCUMENT FORCIBLY | > | UP-DOWN-UP |
| STOP READING | > | LEFT-UP |
| REREAD FRAME | > | ---- |
| REREAD ALL TABS | > | ---- |
| OPEN NEW TAB AND SELECT THE TAB | > | UP |
| OPEN LINK BY BACK TAB | > | ---- |
| OPEN BLANK TAB | > | ---- |
| DUPLICATE TAB | > | DOWN-UP-DOWN |
| PREVIOUS TAB | > | UP-LEFT |
| NEXT TAB | > | UP-RIGHT |
| ... | | ... |

FIG.4

CHANGES IN MOVING DIRECTION

| ORDER | 1 | 2 | 3 | 4 | 5 | 6 |
|---|---|---|---|---|---|---|
| INPUT | ↑ | ↗ | → | ↘ | ↓ | ↑ |

FIG.5

LIBRARY

| ORDER | 1 | 2 | 3 | 4 | 5 | 6 | 7 | 8 | 9 | 10 | 11 |
|---|---|---|---|---|---|---|---|---|---|---|---|
| ⌒↘ | ↑ | ↗ | → | ↘ | ↓ | | | | | | |
| ∿↓ | ↑ | ↗ | → | ↘ | ↓ | ↑ | ↗ | → | ↘ | ↓ | |
| ⌒↺ | ↑ | ↗ | → | ↘ | ↓ | ↑ | ← | ↖ | | | |
| ⌒↻ | ↑ | ↗ | → | ↘ | ↓ | ↑ | ← | → | ↘ | ↓ | ↘ |

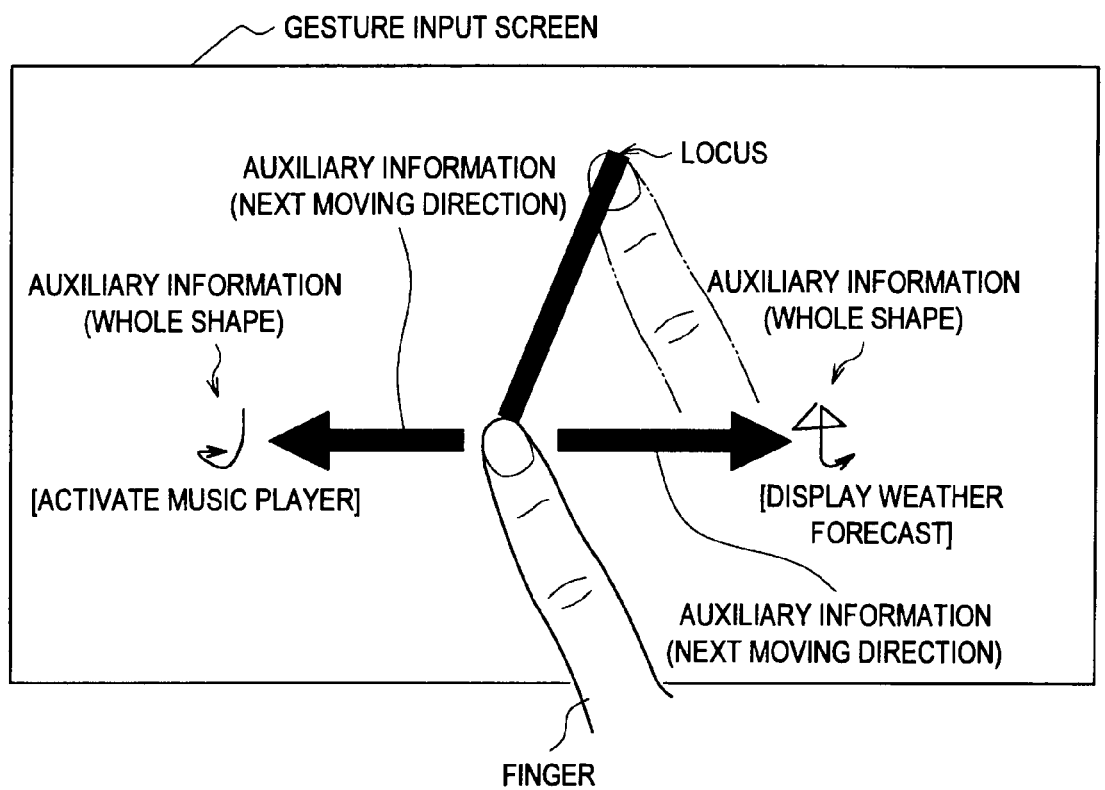

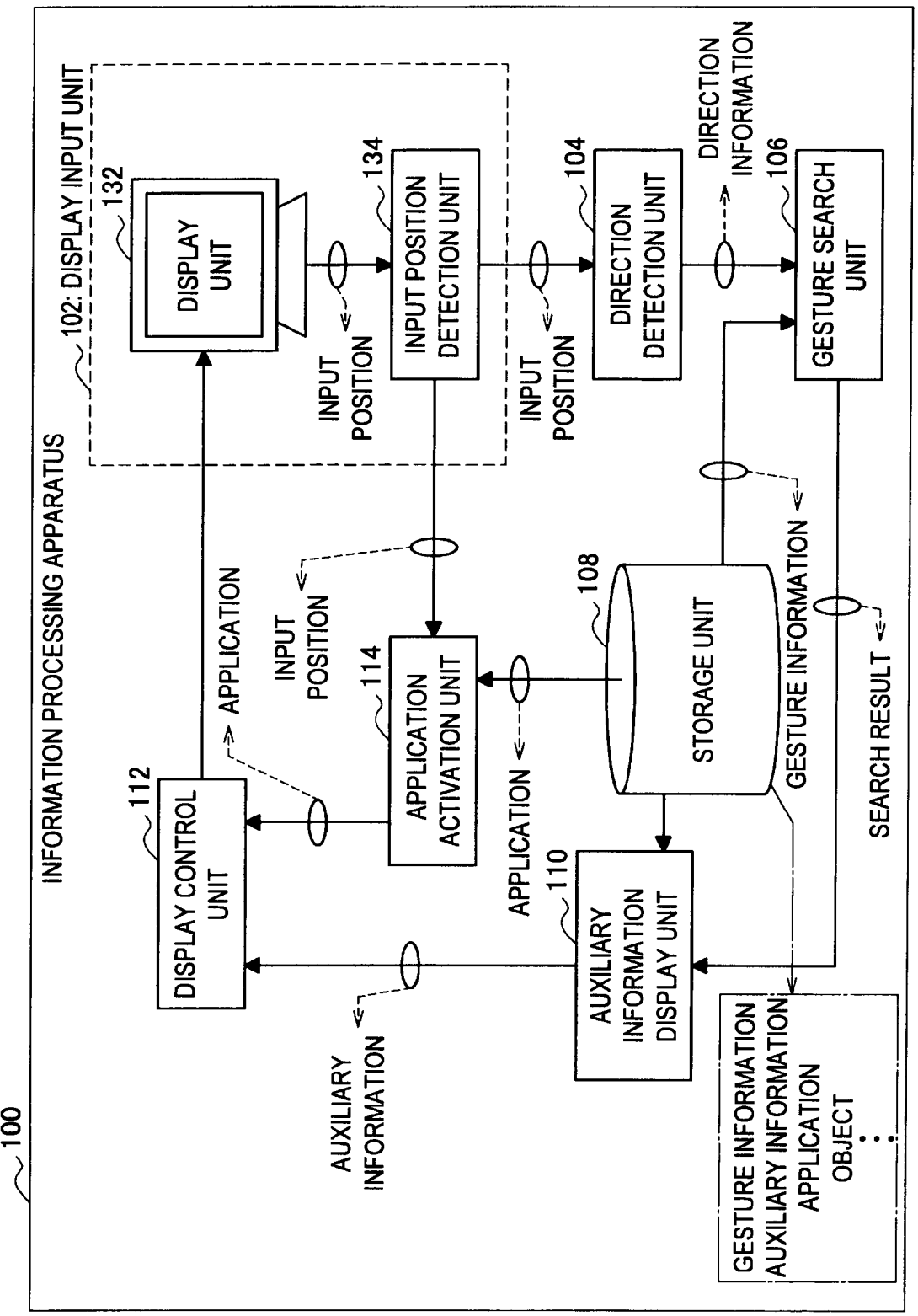

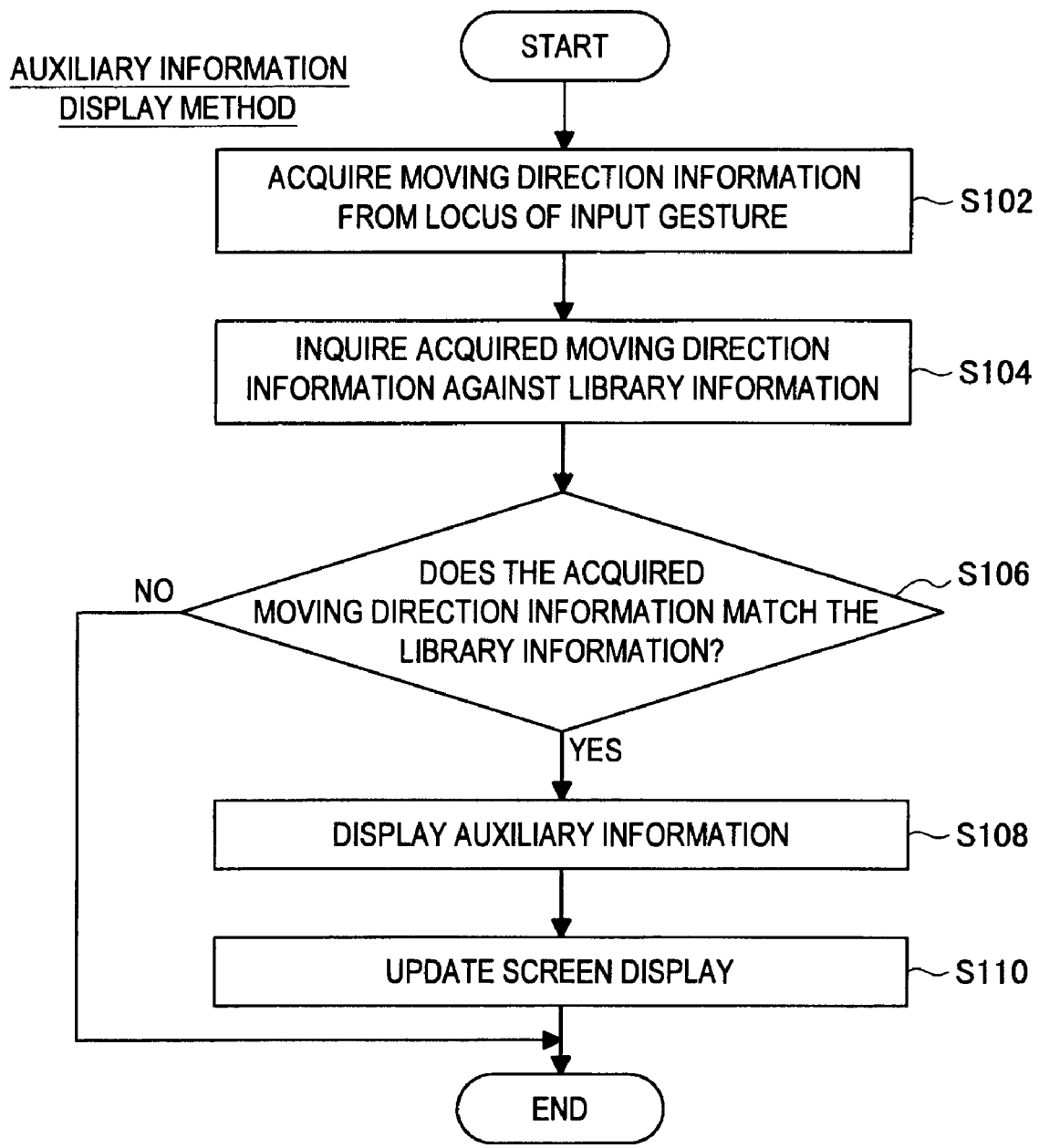

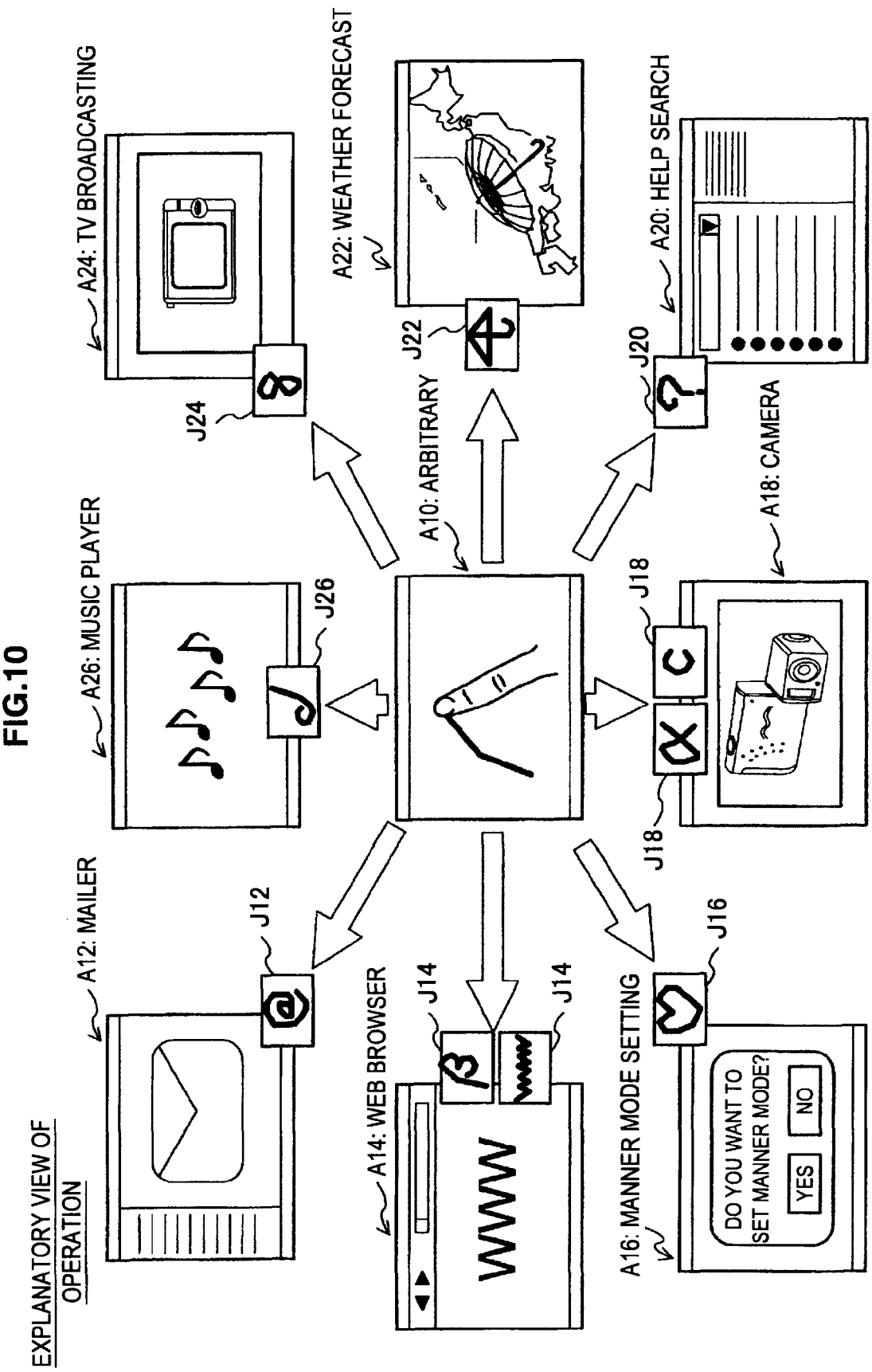

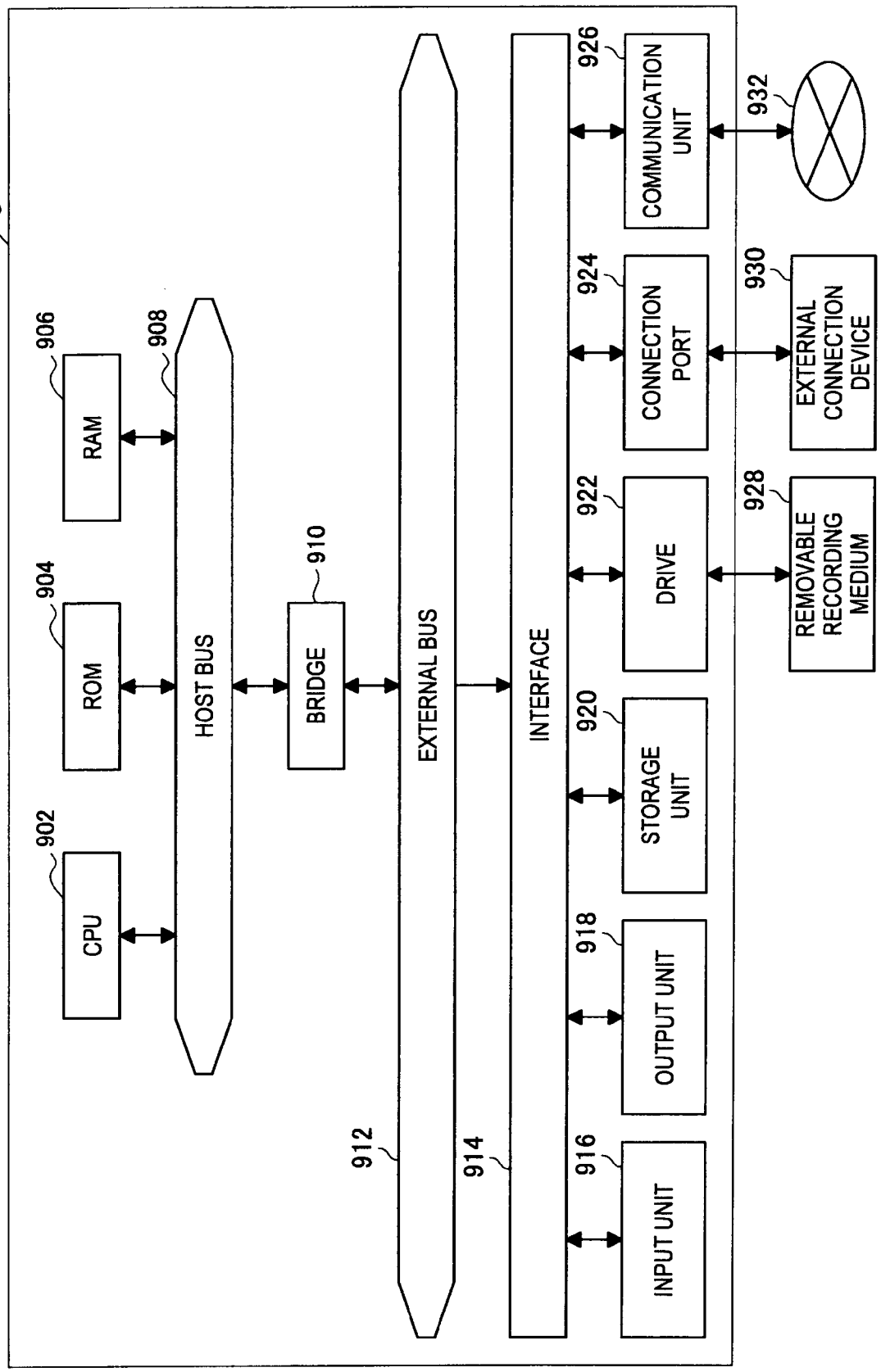

INFORMATION PROCESSING APPARATUS AND METHOD FOR DISPLAYING AUXILIARY INFORMATION

BACKGROUND OF THE INVENTION

1. Field of the Invention

The present invention relates to an information processing apparatus and a method for displaying auxiliary information.

2. Description of the Related Art

An input means such as a keyboard, mouse, touch pad, touch panel, and dial are connected to electronic devices such as a personal computer (hereinafter, referred to as a PC) and mobile phone. Thus, a user can input information into various kinds of electronic devices using these input means. In recent years, a virtual operation system constructed in a display screen using computer graphics (hereinafter, referred to as CG) has used in such electronic devices. Such a virtual operation system is a so-called graphical user interface (hereinafter, referred to as a GUI).

If the GUI is mounted, the user can cause CG to move using the above input means and cause predetermined processing to perform by operating CG. For example, the user can select CG corresponding to a desired application using the mouse and start the desired application by pressing a predetermined key in the keyboard. CG includes a selection button, display menu, and check box. If, for example, a hierarchical display menu is used, applications and the like can hierarchically be classified in accordance with types and attributes, thereby increasing user convenience. However, if the hierarchical structure becomes more complex, operating processes of the user increase so that convenience is rather decreased.

Thus, a special key operation called a short cut may be allocated to each display menu. When such a short cut is used, the user can directly select a desired display menu by performing a special key operation or start an application corresponding to the display menu. A technology called a mouse gesture is known as a technique, like the short cut, to improve operation efficiency of the user. According to this technology, if the user draws a locus of a predetermined shape using a mouse cursor, an application associated with the shape is started.

As an application of the mouse gesture, for example, Japanese Patent Application Laid-Open No. 2005-339420 discloses a technology to start an application by drawing a locus of a predetermined shape on a touch panel using a finger. The above document also describes a concrete example in which the gesture function is applied to on-vehicle equipment like a car navigation system. When the input means is limited like on-vehicle equipment and small information equipment, an operation system capable of inputting information by gestures can significantly improve user convenience.

SUMMARY OF THE INVENTION

However, it is necessary for the user to remember predetermined gestures associated with various operations for inputting gestures. Thus, if shapes of gesture are complex, it becomes difficult for the user to remember shapes of gesture correctly. Moreover, if shapes of gesture are complex, identification precision of gesture shapes is degraded. For these reasons, if shapes of gesture are complex, the probability of erroneous recognition of an input gesture increases, thereby leading to less frequency of use by the user. Thus, simple shapes of gesture are frequently used. However, if gestures in simple shapes are used, the number of types of gesture that can be used will be limited.

The present invention has been made in view of the above issue, and it is desirable to provide a novel and improved information processing apparatus enabling a user to input gestures in complex shapes even if the user does not correctly remember the shapes of such gestures and a method for displaying auxiliary information.

In order to solve the above issue, according to an embodiment of the present invention, there is provided an information processing apparatus, including: a direction detection unit that detects a drawing direction of a locus drawn in an input process of a gesture when the gesture is input; a gesture search unit that searches for the gesture matching the drawing direction of the locus detected by the direction detection unit from among a plurality of predetermined gestures; and an auxiliary information display unit that displays a search result by the gesture search unit in a screen as auxiliary information each time the drawing direction of the locus is detected by the direction detection unit.

Thus, the information processing apparatus detects the direction of a locus drawn in the input process of a gesture through the direction detection unit when the gesture is input. The information processing apparatus also searches for the gesture matching the direction of locus detected by the direction detection unit through the gesture search unit from among a plurality of predetermined gestures. Further, the information processing apparatus displays a search result by the gesture search unit in the screen as auxiliary information through the auxiliary information display unit each time the direction of the locus is detected by the direction detection unit.

The auxiliary information display unit may be configured to display complete pictures of the predetermined gestures extracted by a search of the gesture search unit as the auxiliary information.

The gesture search unit may be configured to search for the gesture matching the drawing direction of the locus from among the predetermined gestures associated with an application related to display information in the screen.

The information processing apparatus may further include an application activation unit that activates the application associated with the predetermined gesture when the complete picture of the predetermined gesture displayed by the auxiliary information display unit is selected.

The auxiliary information display unit may be configured to display only a partial locus following an end edge of the locus as the auxiliary information among the complete picture of the predetermined gesture extracted by a search of the gesture search unit.

The auxiliary information display unit may be configured to display, as the auxiliary information, information about an application corresponding to the predetermined gesture extracted by the search of the gesture search unit by associating with the partial locus displayed as the auxiliary information.

In order to solve the above issue, according to another embodiment of the present invention, there is provided a method for displaying auxiliary information, including the steps of: detecting a drawing direction of a locus drawn in an input process of a gesture when the gesture is input; searching for the gesture matching the drawing direction of the locus detected by the direction detection step from among a plurality of predetermined gestures; and displaying a search result by the gesture search step in a screen as auxiliary information each time the drawing direction of the locus is detected by the direction detection step.

In order to solve the above issue, according to another embodiment of the present invention, there is provided a program that causes a computer to realize functions held by the information processing apparatus. Further, there can be provided a recording medium in which the program is recorded.

According to the embodiments of the present invention described above, a user is enabled to input gestures in complex shapes even if the user does not correctly remember the shapes of such gestures. As a result, improvement of identification precision of input gestures can be expected.

BRIEF DESCRIPTION OF THE DRAWINGS

FIG. 2 is an explanatory view showing setting examples of gestures;

FIG. 4 is an explanatory view showing a gesture input example according to the present embodiment;

FIG. 5 is an explanatory view showing a gesture list example according to the present embodiment;

FIG. 6 is an explanatory view showing a gesture input example according to the present embodiment;

FIG. 7 is an explanatory view showing a gesture list example according to the present embodiment;

FIG. 8 is an explanatory view showing a function configuration of an information processing apparatus according to the present embodiment;

FIG. 9 is an explanatory view showing a flow of display processing of auxiliary information according to the present embodiment;

FIG. 10 is an explanatory view of operation of the information processing apparatus according to the present embodiment; and FIG. 11 is an explanatory view showing a hardware configuration example of the information processing apparatus according to the present embodiment.

DETAILED DESCRIPTION OF THE PREFERRED EMBODIMENTS

Figure 1:
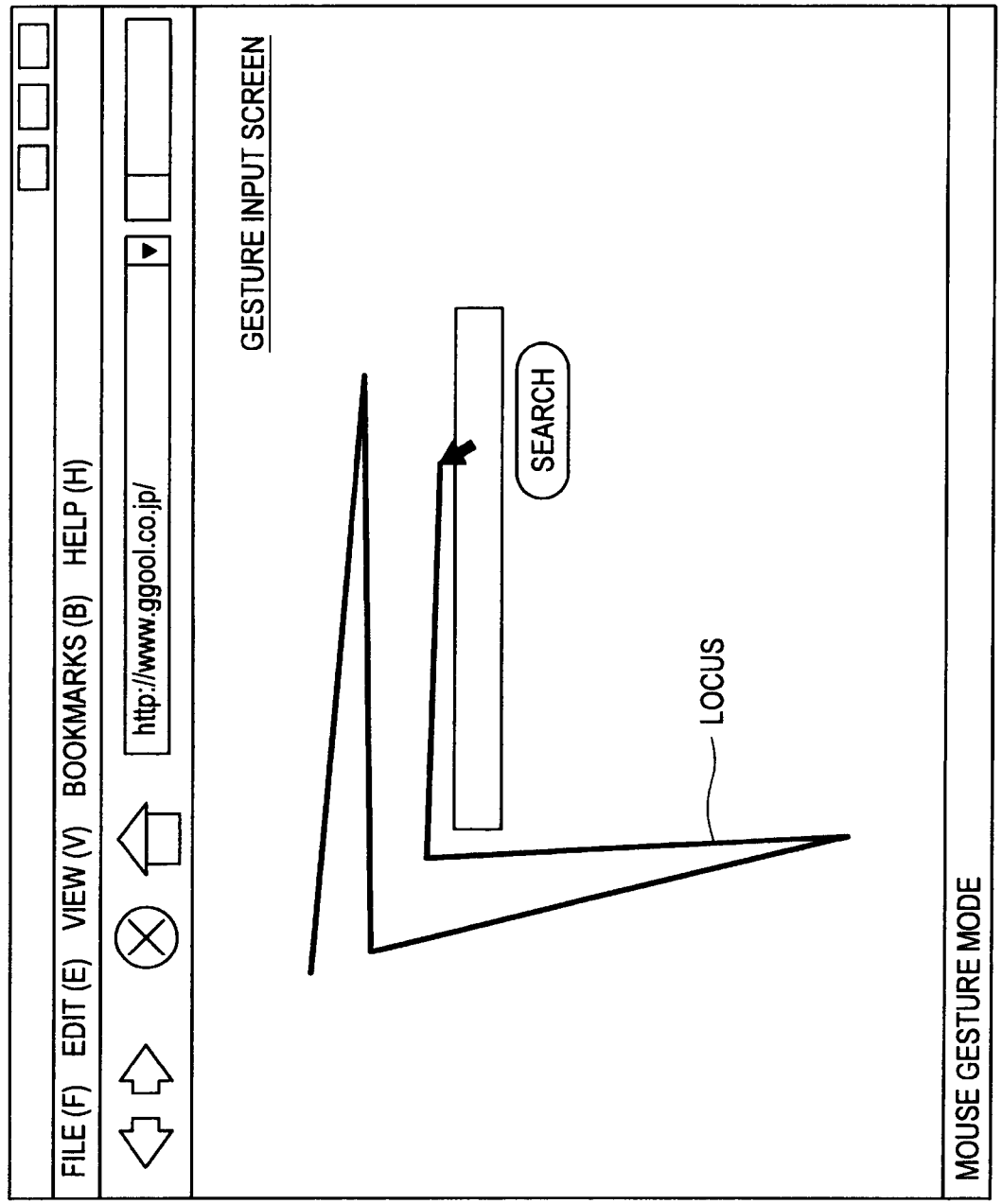
FIG. 1 is an explanatory view showing an input screen example of a mouse gesture.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Flow of Description]

Here, the flow of description of an embodiment of the present invention described below will briefly be mentioned. First, a user operation by a general mouse gesture and a technique for associating a gesture with a function will be described with reference to FIG. 1 and FIG. 2 by citing concrete examples. In a description thereof, what the embodiment of the present invention is intended will be described. Next, a method for displaying auxiliary information according to the present embodiment will be described with reference to FIG. 3 to FIG. 7 by citing concrete examples. In a description thereof, an identification method of gestures will also be concretely described.

Next, the function configuration of an information processing apparatus 100 according to the present embodiment will be described with reference to FIG. 8. Further, the flow of processing according to the method for displaying auxiliary information by the information processing apparatus 100 will be described with reference to FIG. 9. Next, concrete operations of the information processing apparatus 100 according to the present embodiment will be described with reference to FIG. 10. Then, a technical configuration of the present embodiment will briefly be outlined and operation effects achieved by the technical configuration will be described. Lastly, a hardware configuration example of the information processing apparatus 100 according to the present embodiment will be described with reference to FIG. 11.

[Purpose]

Before starting a description of an embodiment of the present invention, a user operation related to gesture input and a technique for associating a gesture with a function will briefly be described with reference to FIG. 1 and FIG. 2. FIG. 1 is an explanatory view showing a concrete user operation according to a mouse gesture. FIG. 2 is an explanatory view showing a gesture setting screen to associate gestures with functions.

First, FIG. 1 will be referenced. In FIG. 1, an execution screen of some application is displayed and a locus drawn by mouse gestures in the execution screen is displayed. As shown also in FIG. 1, many applications have display menus provided in the execution screen. In the example in FIG. 1, "File (F)", "Edit (E)", "View (V)", "Bookmarks (B)", and "Help (H)" are display menus. Further, this application has buttons to go back to previous displays or go forward based on a history, a button to stop reading display content, a button to display predetermined display content and the like are provided in the execution screen.

These display menus and buttons are selected by an input means such as a mouse and keyboard. If, for example, the mouse cursor is placed at a position displayed as "File (F)" and the mouse button is pressed, display content associated with "File (F)" is displayed in the execution screen. If "File (F)" is a hierarchical display menu, a display menu at a lower level of hierarchy is displayed. This operation can also be performed from the keyboard by using a short cut key. For example, the short cut key (F) is associated with "File (F)" and thus, an operation associated with the display menu by pressing a predetermined meta-key and the "F" key.

Further, the user can also perform the above operation using a mouse gesture. In this case, the user draws a predetermined shape in the execution screen by operating the mouse to realize an operation associated with the shape. If, for example, the mouse cursor is moved in the left direction, an operation to bring display content back to previous displays based on a history is realized. Correspondence between a shape of locus drawn by the mouse cursor and operation content is preset as shown in FIG. 2. FIG. 2 shows an example of setting content showing correspondence between a gesture and operation content (function).

In the example in FIG. 2, a "Go back in history" function is associated with a gesture to move the mouse cursor in the left direction. A "Forward in history" function is associated with a gesture to move the mouse cursor in the right direction. Further, a "Reread document" function is associated with a gesture to move the mouse cursor upward and then downward. In this manner, shapes of various gestures are defined by combining a plurality of moving directions. For a "Duplicate tab" function, for example, moving directions of three directions like "downward-upward-downward" are defined as a shape of gesture.

By defining gestures by combining many moving directions in this manner, many functions can be defined. Therefore, the user is enabled to realize many operations only by mouse gestures and user convenience is increased. On the other hand, it becomes more difficult for the user to remember gestures correctly because variations (number of directions) of moving directions to be combined increase and also the number of combinations of moving directions (number of input steps) increase. Moreover, with increasingly more complex shapes of gesture, identification precision when shapes are identified is degraded.

For a gesture including movement in an oblique direction like a locus, for example, shown in FIG. 1, a portion where it is difficult to determine whether the user intends movement in the oblique direction or movement in the vertical direction may be contained. If a gesture contains many operation steps, an occurrence of erroneous recognition of only one operation step invalidates realization of a function intended by the user. To avoid such a problem, it is necessary to make the user input the shape of a gesture correctly. Thus, the inventors of the present invention have devised a technology to effectively present auxiliary information so that the user can correctly input the shape of a gesture.

Using the technology, gestures can be input correctly regardless of complexity of the shape, so that complex gestures that were substantially unable to use in the past can now be used. As a result, many functions can be realized by gesture input. Further, for electronic devices whose input means are limited, an effect of being able to mount many functions whose usage was limited due to difficulty of input operations in the past can also be expected. An embodiment described later is mainly intended to provide the technology to present auxiliary information capable of enjoying these effects.

Embodiment

An embodiment of the present invention will be described below. The present embodiment relates to a technology to present auxiliary information related to gesture input to the user. In contrast to a technology to assist in input operations by causing the user to reference a list of gestures, the technology successively displays auxiliary information in a process in which the user performs input operations. Thus, the user is free from a burden to search the list for a desired gesture and remember whole shapes of gestures in advance. Moreover, a display space to display the list becomes unnecessary so that the technology is suitably used also in electronic devices having smaller screen size.

[Method for Displaying Auxiliary Information]

First, the method for displaying auxiliary information according to the present embodiment will be described. Here, the display method will be described by exemplifying two display modes embodying technical ideas of the present embodiment. One is a display mode that displays a whole shape of gesture that becomes a candidate in an input process of gestures. The other is a display mode that displays a partial shape (next operation step) of gesture that becomes a candidate in the input process of gestures. However, the technical scope of the present embodiment is not limited to these examples.

(Configuration to Display a Whole Shape)

Figure 3:
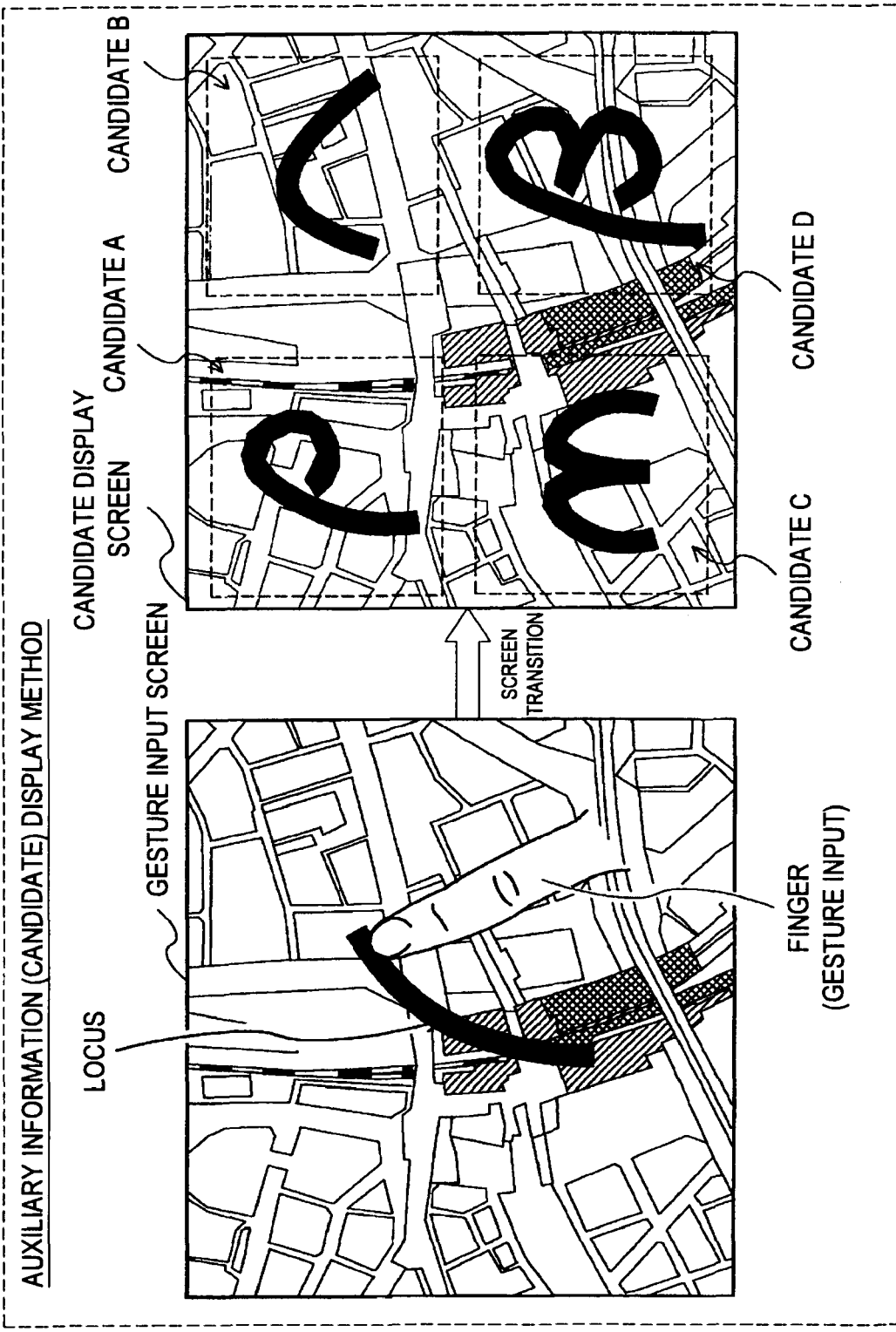
FIG. 3 is an explanatory view showing a display example of auxiliary information according to an embodiment of the present invention.

First, a display configuration to display a whole shape of a gesture that becomes a candidate in the input process of gestures as auxiliary information will be described with reference to FIG. 3. FIG. 3 is an explanatory view showing an example of the method for displaying auxiliary information according to the present embodiment.

In the example in FIG. 3, a map is displayed in the gesture input screen into which gestures are input. The gesture input screen is constituted by a touch panel or the like and configured in such a way that a locus of a gesture is drawn in the screen by being traced by the user using a finger or the like. However, the position where the user inputs a gesture is arbitrary. Note that, though denoted as the "gesture input screen", a dedicated screen to input gestures is not meant and instead a display screen when a gesture is input is meant.

When a gesture is input by the user, as shown in FIG. 3, a locus traced by the finger of the user or the like is displayed in the gesture input screen. At this point, the moving direction of the finger or the like is detected and a candidate of gesture displayed as auxiliary information is searched for. The moving direction is calculated from position changes of the finger or the like detected successively. Further, the closest to the moving direction calculated from the direction of position changes is selected from among a plurality of preset moving directions. At this point, angle information of the moving direction calculated from position changes is detected and a predetermined moving direction is selected depending on the angle information.

By selecting the moving direction in this manner, a plurality of moving directions is detected while one gesture is input. That is, information about moving directions as many as the number of times of the moving direction changed is accumulated. At this point, information about moving directions includes information about the order of detection and selection. Thus, gesture candidates can be searched for based on information about the combination of moving directions and the order. The shape of a gesture is formed by combining a plurality of preset direction vectors. Thus, the above search is performed by inquiring the direction of the direction vector forming a gesture against the moving direction.

Consider a case when, as shown, for example, in FIG. 4, a gesture including six operation steps is input and the moving direction is successively detected and selected. The operation step here means one movement section before the moving direction changes. The example in FIG. 4 shows information about a locus that moves upward firstly, in the upper right direction secondly, in the right direction thirdly, in the lower right direction fourthly, downward fifthly, and upward sixthly. Thus, information about the moving direction in each operation step and the order is detected as information about changes of the moving direction.

Information detected in the manner is inquired against information of gestures preset as illustrated in FIG. 5 (hereinafter, referred to as a library) to search for gestures to be candidates. In the example in FIG. 5, a library of four gestures is shown. It is clear that, for example, the gesture shown in the top line is defined by direction vectors corresponding to five operation steps. The gesture is selected when a locus moves upward firstly, in the upper right direction secondly, in the right direction thirdly, in the lower right direction fourthly, and downward fifthly.

Similarly, the gesture in the second line from the top of the library is defined by direction vectors corresponding to 10 operation steps. The gesture in the third line from the top is defined by direction vectors corresponding to eight operation steps. Further, the gesture in the fourth line from the top is defined by direction vectors corresponding to 11 operation steps. However, direction vectors constituting these gestures are common up to the fifth operation step. Thus, when moving directions up to the fifth operation step are input of input information of gestures shown in FIG. 4, these four gestures are extracted as candidates.

If, as shown, for example, in FIG. 3, information of "moving upward" is input into the gesture input screen in the first operation step, gestures in the library matching information of the moving direction is searched for and four gestures are extracted as candidates. These extracted gestures are displayed, as shown in FIG. 3 (candidate display screen), by being arranged so that the whole shape of each gesture is shown. Note that, though denoted as the "candidate display screen", a dedicated screen to display gesture candidates is not meant and instead a display screen when gesture candidates are displayed is meant.

In the example in FIG. 3, the gesture in the first line from the top of the library is displayed as a candidate B. Similarly, the gesture in the second line from the top of the library is displayed as a candidate C, the gesture in the third line from the top of the library as a candidate A, and the gesture in the fourth line from the top of the library as a candidate D. These candidates A to D are displayed as reference information when the user inputs the next operation step. However, these candidates A to D may be displayed as a selectable region so that when being touched by the user, the function corresponding to the gesture is realized.

The example in FIG. 3 shows the display configuration of the candidate display screen when the first operation step is input and as operation steps progress, displayed candidates of gesture are narrowed down. When, for example, the sixth operation step is reached along changes in the moving direction shown in FIG. 4, the gesture in the first line from the top of the library shown in FIG. 5 is excluded as a candidate because the gesture does not have the sixth direction vector. When information of "moving in the upper right direction" is input as the seventh operation step, candidates are narrowed down to the gesture in the second line from the top of the library.

Each time gestures are narrowed down in this manner, the candidate display screen is updated and only gestures suiting an input locus are displayed. In the above narrow-down search, content displayed in the gesture input screen may be considered. If, as shown, for example, in FIG. 3, map information is displayed in the gesture input screen, a gesture corresponding to an input locus may be selected from gestures corresponding to a function related to the map information.

In this case, if the map information is displayed, for example, gestures associated with the scaling function of a map, display function of route information, display function of traffic information, display function of weather information, activation function of a route search application or the like are extracted. Naturally, gestures corresponding to an application or displayed information unrelated to display content may be extracted. Similarly, the library of gestures to be searched may be changed in accordance with time information, position information and the like.

With auxiliary information presented in real time in accordance with gesture input by the user in this manner, the user does not have to remember shapes of gestures and the input order correctly. Moreover, gesture candidates are automatically narrowed down and the user can easily find a desired gesture. Further, if a desired gesture is displayed during input, the number of operation steps can be reduced by selecting the gesture so that a desired function can be realized more quickly.

Therefore, burdens of the user related to gesture input are naturally alleviated and the possibility of erroneous recognition due to an unreliable memory is reduced so that gestures of complex shapes including many directions can be defined. Moreover, the number of functions allocated to gestures increases and it becomes possible to define gestures in shapes from which functions or operation results are more easily recollected. As a result, correspondence between functions or operation results and gestures is more easily recognized by the user and search efficiency of gestures corresponding to a desired function is improved.

For example, the gesture of the candidate A shown in FIG. 3 is defined by imitating the alphabet "P". Thus, if the gesture of the candidate A is associated with a function to "display a nearby parking area (Parking)", the user will easily be able to recollect an operation result from the shape of the gesture. Similarly, the gesture of the candidate D is defined by imitating the Greek character "β". Thus, if the gesture of the candidate D is associated with a function to "activate the browser", the user will easily be able to recollect an operation result from the shape of the gesture.

If the user can easily recollect an operation result in this manner, the user will be able to select a desired gesture without an operation result being displayed for candidates of each gesture by character and the display region can more efficiently be used for a portion of the omitted character display. Moreover, with an operation result enabled to recollect from the shape of a gesture, a function or operation result associated with the gesture can easily be recognized even if the gesture is displayed by being scaled down. While FIG. 3 shows a configuration example in which gesture candidates are arranged filling the screen, the above effect is achieved when gesture candidates are displayed in a portion of the screen by being scaled down.

In the foregoing, the display configuration in which whole shapes of gestures to be candidates in the input process of gestures are displayed as auxiliary information has been described. According to the display configuration, candidates of gesture are narrowed down based on information of the moving direction in a process in which a gesture is input by the user and the whole shape thereof is successively presented to the user as auxiliary information. With such a configuration, the user is free from a burden to remember many gestures having complex shapes correctly. Further, the user can quickly invoke a desired function by selecting a narrowed-down candidate.

(Configuration to Display a Partial Shape)

Next, the display configuration to display a partial shape (next operation step) of a gesture that becomes a candidate in the input process of gestures as auxiliary information will be described with reference to FIG. 6. FIG. 6 is an explanatory view exemplifying the method for displaying auxiliary information according to the present embodiment. In contract to the configuration in which the whole shape of a gesture is displayed shown in FIG. 3, this example has the next operation step following an input locus displayed.

FIG. 6 shows a gesture input screen into which a gesture is input. Like in FIG. 3, the gesture input screen is constituted by a touch panel or the like and configured in such a way that a locus of a gesture is drawn in the screen by being traced by the user using a finger or the like. However, the position where the user inputs a gesture is arbitrary. Note that, though denoted as the "gesture input screen", a dedicated screen to input gestures is not meant and instead a display screen when a gesture is input is meant.

When, as shown in FIG. 6, a gesture is input by the user, a locus traced by the finger of the user or the like is displayed in the gesture input screen. At this point, the moving direction of the finger or the like is detected and a candidate of gesture displayed as auxiliary information is searched for.

The detection method of the moving direction and the candidate search method of gestures are the same as those of the example in FIG. 3. However, for a candidate of gesture obtained as a search result, instead of a whole shape thereof being displayed in the gesture input screen, only the shape of the next operation step is displayed. In addition to the shape of the next operation step, the whole shape of a gesture may be displayed by being scaled down or information of an operation result may be displayed.

FIG. 6 shows an example in which after information of "moving in the lower left direction" being input, a gesture corresponding to the function to "activate a music player" and that corresponding to the function to "display weather forecast" are extracted as auxiliary information.

At this point, an arrow to show the next moving direction is shown as one piece of auxiliary information. That is, the function corresponding to the arrow will be invoked by proceeding with an input operation in the arrow direction displayed here. In FIG. 6, an arrow in the right direction and that in the left direction are displayed. These arrows show the next operation steps of gestures narrowed down based on the moving direction of a locus. Therefore, if a candidate of gesture including the next operation step of "moving downward" is present, a downward arrow is displayed.

Thus, in the display configuration in which only a portion of a gesture is displayed, it is difficult for the user to recognize correspondence between a gesture and a function or operation result. Thus, information about a function or operation result is displayed as auxiliary information at a position that makes correspondence to the next operation step understandable. As information about a function or operation result here, for example, character information showing content of a function is displayed. In the example in FIG. 6, information of [Activate music player] and [Display weather forecast] is displayed as character information. As information about a function or operation result, for example, the whole shape of a gesture may be displayed by being scaled down.

Like the display configuration showing the whole shape of gestures illustrated and described in FIG. 3, if defined in such a way that an operation result or the like is recollected by the user from the shape of a gesture, an operation result or the like realized by proceeding with the next and subsequent operation steps from the whole shape thereof can easily be recognized. In the example in FIG. 6, for example, the whole shape of a gesture corresponding to [Activate music player] is defined as a shape imitating a note. The whole shape of a gesture corresponding to [Display weather forecast] is defined as a shape imitating an umbrella. By adopting such a display configuration, the user will be able to easily determine desired operation steps.

In the example in FIG. 6, auxiliary information corresponding to one gesture candidate is displayed for one arrow. However, if a plurality of gesture candidates is present, auxiliary information corresponding to each gesture candidate is displayed. In this case, a plurality of whole shapes of reduced gesture candidates may be displayed or a plurality of strings indicating an operation result, function or the like may be displayed for one arrow. In such a case, gesture candidates are narrowed down as operation steps proceed and each time the number of pieces of auxiliary information decreases. Therefore, auxiliary information decreases as the user draws a complete picture of the gesture and an invocation of a function or an operation corresponding to the desired gesture is realized in the end.

Assume, for example, that a library of the gesture as shown in FIG. 7 is defined. In this case, if a locus of "moving in the lower left direction" is input in the first operation step, an arrow corresponding to the second direction vector is displayed in the gesture input screen. In the case of the library in FIG. 7, the second direction vector of the gesture in the first line from the top shows the left direction. On the other hand, the second direction vector of the gesture in the second line from the top shows the right direction. Thus, as shown in FIG. 6, an arrow in the right direction and that in the left direction are displayed in the gesture input screen as auxiliary information.

If a locus of "moving in the right direction" is input in the second operation step, candidates are narrowed down to the gesture in the second line from the top of the library because the input locus does not match the second direction vector of the gesture in the first line from the top of the library. As a result, when the locus of "moving in the right direction" is input in the second operation step, the function to [display weather forecast] is invoked and, for example, weather forecast information is displayed in the screen. Incidentally, the user may select auxiliary information displayed in the first operation step so that a function or operation corresponding to the auxiliary information is realized.

In the foregoing, the display configuration in which a partial shape of a gesture to be a candidate in the input process of gesture is successively displayed as auxiliary information has been described. According to the display configuration, candidates of gesture are narrowed down based on information of the moving direction in a process in which a gesture is input by the user and a partial shape thereof is successively presented to the user as auxiliary information. With such a configuration, the user is free from a burden to remember many gestures having complex shapes correctly. Further, the user can quickly invoke a desired function by selecting a narrowed-down candidate. Moreover, when compared with the example in FIG. 3, a smaller screen region is used to display auxiliary information so that complicatedness in the screen display is reduced and also the whole screen can be used more efficiently.

[Function Configuration of Information Processing Apparatus 100]

Next, the function configuration of the information processing apparatus 100 capable of realizing each display configuration described above will be described with reference to FIG. 8. FIG. 8 is an explanatory view showing the function configuration of the information processing apparatus 100 according to the present embodiment. The function of the information processing apparatus 100 is realized, for example, by a mobile information terminal, mobile phone, mobile game machine, broadcasting equipment, PC, car navigation system, information home appliance and the like. A hardware configuration example of the information processing apparatus 100 will be described later in detail with reference to FIG. 11.

As shown in FIG. 8, the information processing apparatus 100 mainly includes a display input unit 102, a direction detection unit 104, a gesture search unit 106, a storage unit 108, an auxiliary information display unit 110, a display control unit 112, and an application activation unit 114.

The function of the direction detection unit 104 is realized, among hardware configurations shown in FIG. 11, by a CPU 902 based on a program recorded in a ROM 904, a RAM 906, a storage unit 920, or a removable recording medium 928. The functions of the gesture search unit 106, the auxiliary information display unit 110, the display control unit 112, and the application activation unit 114 are realized in a similar manner. Further, the function of the storage unit 108 is realized by the function of, for example, the RAM 906, the storage unit 920, or the removable recording medium 928. Then, the function of the display input unit 102 is realized, for example, by combining functions of an input unit 916 and an output unit 918.

(Display Input Unit 102)

The display input unit 102 is constituted by a display unit 132 and an input position detection unit 134. The function of the display input unit 102 is realized, for example, by a touch panel. In this case, the function of the display unit 132 and that of the input position detection unit 134 are both realized by a touch panel. The function of the display input unit 102 is also realized by combining a display and a touch pad. In this case, the function of the display unit 132 is realized by the display and that of the input position detection unit 134 by the touch pad. However, the present embodiment is not limited to these examples.

Various kinds of information are displayed in the display unit 132. For example, map information, traffic information, video and program information of broadcasting programs, an activation screen of applications, an execution screen of games, and a display screen of dynamic images and static images are displayed in the display unit 132. Further, loci of gestures input by the user and information about gesture candidates searched based on the loci are displayed in the display unit 132. Whole shapes of gestures (FIG. 3), arrows, reduced whole shapes of gesture candidates, character information of functions or operation results (FIG. 6) and the like are displayed as information about gesture candidates displayed in the display unit 132. Such display content is controlled by the display control unit 112.

The input position detection unit 134 detects information of input positions when a gesture is input by the user. If, for example, the display input unit 102 is a touch panel, the input position detection unit 134 detects positions in the screen of the display unit 132 being traced by a finger of the user or the like. If, on the other hand, the display input unit 102 is constituted as a combination of a display and a touch pad, the input position detection unit 134 detects positions on the touch pad being traced by the finger of the user or the like. The input position detection unit 134 may also be constituted as means for detecting position information of a locus drawn by a mouse. Information about input positions detected by the input position detection unit 134 in this manner is input into the direction detection unit 104 and the application activation unit 114.

(Direction Detection Unit 104)

The direction detection unit 104 detects the moving direction of user input based on information about input positions input from the input position detection unit 134. For example, the direction detection unit 104 calculates an angle formed between a line connecting a plurality of input positions and a predetermined reference direction. At this point, if an input position moves a predetermined distance, the direction detection unit 104 calculates an angle formed between a line connecting the input positions before and after the movement and the reference direction. The predetermined distance is set in accordance with the screen size of the gesture input screen, complexity of gesture shapes registered with a library or the like when necessary. Information about the angle calculated in this manner is input into the gesture search unit 106 as direction information showing the moving direction of user input. For example, information about the angle showing changes of the moving direction shown in FIG. 4 is input into the gesture search unit 106.

(Gesture Search Unit 106)

When direction information showing the moving direction of user input is input from the direction detection unit 104, the gesture search unit 106 searches for gesture candidates matching the direction information. At this point, the gesture search unit 106 references gesture information recorded in the storage unit 108 and extracts gesture candidates matching the input direction information. The storage unit 108 has a library shown in FIG. 5 or FIG. 7 recorded therein. In the library, the direction of a direction vector forming a gesture and the input order are associated for registration.

Thus, the gesture search unit 106 successively references the input direction information and the direction vector of each gesture registered with the library to narrow down gesture candidates. At this point, the gesture search unit 106 narrows down gesture candidates each time direction information is input for a sequence of gesture input. That is, gesture candidates narrowed down corresponding to each operation step are obtained as a search result. The search result is input into the auxiliary information display unit 110.

(Auxiliary Information Display Unit 110)

The auxiliary information display unit 110 acquires auxiliary information corresponding to the search result input from the gesture search unit 106 from the storage unit 108 and inputs the auxiliary information into the display control unit 112. In addition to the library, the storage unit 108 has auxiliary information corresponding to each gesture registered with the library stored therein. The auxiliary information includes, for example, display objects or reduced display objects showing whole shapes of gestures, arrow objects showing directions of direction vectors, and character information showing a function or operation result of each gesture.

In a display mode in which, as shown, for example, in FIG. 3, a whole shape of a gesture is displayed as auxiliary information, the auxiliary information display unit 110 inputs display objects showing whole shapes of gestures in accordance with an input search result into the display control unit 112. On the other hand, in a display mode in which, as shown in FIG. 6, a partial shape of a gesture is displayed as auxiliary information, the auxiliary information display unit 110 inputs arrow objects showing directions of direction vectors and the like in accordance with an input search result into the display control unit 112. At this point, the auxiliary information display unit 110 may be configured to input reduced display objects showing whole shapes of gestures, character information showing a function or operation result of the gesture into the display control unit 112.

(Display Control Unit 112)

The display control unit 112 is means for exercising control so that any information is displayed in the display unit 132. For example, the display control unit 112 controls the display unit 132 so that auxiliary information input from the auxiliary information display unit 110 is displayed. The display control unit 112 also causes the display unit 132 to display an activation screen of application as shown in FIG. 3 or a locus of an input gesture. Further, the display control unit 112 causes the display unit 132 to display a popup window in the screen of the display unit 132 or split the display region in the screen.

(Application Activation Unit 114)

When a candidate of gesture or the like displayed in the display unit 132 is selected by the user, the application activation unit 114 activates an application corresponding to the gesture. If, for example, a candidate A displayed in the candidate display screen in FIG. 3 is selected, the application activation unit 114 reads an application to "display parking area" from the storage unit 108 and activates the application. Then, the application activation unit 114 inputs information about the activation screen of the application into the display control unit 112.

The application includes, as shown, for example, in FIG. 10, a mailer A12 to transmit and receive electronic mails and a Web browser A14 to view homepages. In addition, the storage unit 108 may store a manner node setting application A16 to set the manner mode and a camera application A18 to provide a camera function. Further, the storage unit 108 may store a help search application A20 to search for help information and a weather forecast display application A22 to display a weather forecast. Then, the storage unit 108 may store a TV broadcasting application A24 to receive and display TV broadcasts and a music player A26.

These applications are associated with each gesture registered with the library, and the application activation unit 114 activates the application corresponding to the gesture selected by the user. At this point, the application activation unit 114 activates the application by reading an executable file of the application and data used for activation of the application from the storage unit 108. Screen information of the activated application is input into the display control unit 112 before being displayed in the display unit 132. Note that the expression of "application" is used in the above description, but the "application" here means any information mode used to provide information to the user.

In the foregoing, the function configuration of the information processing apparatus 100 according to the present embodiment has been described. As described above, the information processing apparatus 100 has a function to provide auxiliary information suiting to direction information in real time by detecting the direction information of a locus for each operation step of the user from the locus of a gesture input by the user. Auxiliary information provided to the user includes whole shapes of partial shapes of gesture candidates displayed in each operation step and a function or operation result associated with each gesture candidate.

As a result, the user can successively reference auxiliary information in the input process of gesture so that the user does not have to remember shapes of gestures correctly. Thus, even if a gesture to be registered is defined as a complex shape, the user will be able to input the gesture with relatively high precision so that erroneous recognition of gesture will be reduced. Because such an effect can be expected, it becomes possible conversely to define a gesture with a complex shape. Thus, many operations can be defined by gestures so that operability of the user can significantly be improved in electronic devices whose input means are limited.

[Flow of Display Processing of Auxiliary Information]

Next, a sequence of flow related to display processing concerning the method for displaying auxiliary information according to the present embodiment will be described with reference to FIG. 9. FIG. 9 is an explanatory view showing the method for displaying auxiliary information according to the present embodiment. A sequence of processing shown here is realized by functions held by the information processing apparatus 100 described above.

As shown in FIG. 9, first information about the moving direction is acquired from a locus of an input gesture (S102). Next, the acquired information about the moving direction is inquired against information in the library (S104). The information in the library here is information about the direction vector in each order of each gesture registered with the library. Next, it is determined whether the acquired information about the moving direction matches the information in the library (S106). If the acquired information is determined to match the information in the library, processing proceeds to processing at step S108. If the acquired information is determined not to match the information in the library, processing proceeds to processing at step S110.

At step S108, auxiliary information corresponding to the gesture determined to match at step S106 is displayed (S108). If a plurality of gestures matches the acquired information about the moving direction and is extracted as candidates, all or a portion of these candidates are displayed as auxiliary information. Next, the screen display is updated (S110) before a sequence of processing according to the method for displaying auxiliary information terminates.

[Concrete Example]

Here, a concrete example realized when the method for displaying an auxiliary information described above is applied using the functions of the information processing apparatus 100 will be shown with reference to FIG. 10. FIG. 10 is an explanatory view of operation of the information processing apparatus 100 according to the present embodiment.

In FIG. 10, a gesture input screen A10 in which any information is displayed and various kinds of applications A12, A14, A16, A18, A20, A22, A24, and A26 are shown. For each application, associated respective gestures J12, J14, J16, J18, J20, J22, J24, and J26 are shown. The example in FIG. 10 shows a state in which, while some arbitrary application A10 is active, the user activates another application. The arbitrary application A10 is one of the applications shown in FIG. 10 or any other application.

In recent years, electronic devices have widely diverse applications mounted thereon. We have an impression that the mailer A12, the Web browser A14, the camera A18, the TV broadcasting A24, and the music player A26 have become necessary functions. However, if an attempt is made to activate another application while an application is active, the user is prompted to terminate the active application before activating another application. If, for example, the weather of tomorrow is referenced while writing a mail, it is necessary for the user to terminate the mailer A12 by saving the mail that is not finished and then activate the weather forecast A22.

In a PC having a large display screen, a plurality of applications can easily be switched and used by maintaining the plurality of windows displayed in the screen. However, if only one or few applications can be displayed in a screen, a moving operation between applications is a severe burden on the user. However, using the technology in the present embodiment, a desired application can be activated only by inputting one gesture from the screen of any application. Further, when the original display should be restored, the user can accomplish that only by inputting one gesture.

If the technology in the present embodiment is used, erroneous recognition rarely occurs even if the shape of a gesture is complex, so that the shape of a gesture can be defined in such a way that the user can easily recollect a function or operation result of each application. Thus, desired applications can be switched by intuitive operations, which reduces operation processes and, as a result, high-speed application switching processing is realized.

As shown, for example, in FIG. 10, the gesture J12 in a shape similar to the "@" mark is associated with the mailer A12. The gestures J14 in shapes similar to "β" and "www" are associated with the Web browser A14. Similarly, the heart mark J16 is associated with the manner mode setting A16, the gesture J18 in shapes similar to "α" and "c" to the camera A18, and the gesture J20 similar to "?" to the help search A20. Further, the umbrella mark J22 is associated with the weather forecast A22, the gesture J24 similar to "8" to the TV broadcasting, and the note mark J26 to the music player A26.

Though what is shown in FIG. 10 is only an example, the user is thereby free from a burden to correctly remember gestures by shapes of gesture suggesting applications being definable so that gestures can conveniently be used. Such an improvement effect of convenience is obtained by improved recognition precision for gestures in complex shapes being achieved originating from a display technology of auxiliary information according to the present embodiment. Thus, the present embodiment reduces burdens of the user to provide an operation system highly convenient to the user and also enables usage of gestures having complex shapes in many scenes.

[Hardware Configuration of Information Processing Apparatus 100]

The function of each component held by the information processing apparatus 100 can be realized using a computer program to realize the above function, for example, by the hardware configuration shown in FIG. 11. FIG. 11 is an explanatory view showing a hardware configuration capable of realizing the function held by each component by the information processing apparatus 100. The form of the information processing apparatus 100 is arbitrary and, for example, forms of a mobile information terminal such as a personal computer, mobile phone, PHS (Personal Handyphone System), and PDA (Personal Digital Assistant), a game machine, and various kinds of information home appliances are included therein.

As shown in FIG. 11, the information processing apparatus mainly includes a CPU (Central Processing Unit) 902, a ROM (Read Only Memory) 904, a RAM (Random Access Memory) 906, a Host bus 908, a bridge 910, an external bus 912, an interface 914, an input unit 916, an output unit 918, a storage unit 920, a drive 922, a connection port 924, and a communication unit 926.

The CPU 902 functions as an arithmetic processing unit or a control unit and controls an entire operation of the constituent elements or some of the constituent elements on the basis of various programs recorded on the ROM 904, the RAM 906, the storage unit 920, or the removal recording medium 928. The ROM 904 stores, for example, a program loaded on the CPU 902 or data or the like used in an arithmetic operation. The RAM 906 temporarily or perpetually stores, for example, a program loaded on the CPU 902 or various parameters or the like arbitrarily changed in execution of the program. These constituent elements are connected to each other by, for example, the host bus 908 which can perform high-speed data transmission. The host bus 908, for example, is connected to the external bus 912 in which a data transmission speed is relatively low through the bridge 910.

The input unit 916 is, for example, an operation unit such as a mouse, a keyboard, a touch panel, button, a switch, or a lever. The input unit 916 may be a remote control unit (so-called remote) that can transmit a control signal by using an infrared ray or other radio waves. The input unit 916 includes an input control circuit or the like to transmit information input by using the operation unit to the CPU 902 through an input signal.

The output unit 918 is, for example, a display device such as a CRT (Cathode Ray Tube), an LCD (Liquid Crystal Display), a PDP (Plasma Display Panel), or an ELD (Electro-Luminescence Display), an audio output device such as a loudspeaker or headphones, a printer, a mobile phone, or a facsimile that can visually or auditorily notify a user of acquired information.

The storage unit 920 is a device to store various data, and includes, for example, a magnetic storage device such as a hard disk drive (HDD; Hard Disk Drive), a semiconductor storage device, an optical storage device, or a magnetooptical storage device, or the like.

The drive 922 is a device that reads information recorded on the removal recording medium 928 such as a magnetic disk, an optical disk, a magnetooptical disk, or a semiconductor memory or writes information in the removal recording medium 928. The removal recording medium 928 is, for example, a DVD medium, a Blue-ray medium, an HD-DVD medium, a compact flash (CF; compactFlash) (registered trademark), a memorystick, or an SD memory card (Secure Digital memory card), or the like. As a matter of course, the removal recording medium 928 may be, for example, an IC card (Integrated Circuit Card) on which a non-contact IC chip is mounted, an electronic device, or the like.

The connection port 924 is a port such as an USB (Universal Serial Bus) port, an IEEE1394 port, a SCSI (Small Computer System Interface), an RS-232C port, or an optical audio terminal to which the external connection device 930 is connected. The external connection device 930 is, for example, a printer, a mobile music player, a digital camera, a digital video camera, an IC recorder, or the like.

The communication unit 926 is a communication device to be connected to a network 932. For example, a communication card for a wired or wireless LAN (Local Area Network), Bluetooth (registered trademark), or WUSB (Wireless USB), an optical communication router, an ADSL (Asymmetric Digital Subscriber Line) router, various communication modems, or the like is used. The network 932 connected to the communication unit 926 includes a wiredly or wirelessly connected network. For example, the Internet, a home-use LAN, infrared communication, broadcasting, satellite communication, or the like is used.

Lastly, the function configuration held by an information processing apparatus in the present embodiment and operation effects achieved by the function configuration will briefly be summarized. The function configuration held by an information processing apparatus in the present embodiment can be expressed as described below.

The information processing apparatus can be constituted, for example, by including a direction detection unit, a gesture search unit, and an auxiliary information display unit. The direction detection unit is used to detect a drawing direction of a locus drawn (or a moving direction of input positions) in an input process of a gesture when the gesture is input. The gesture search unit is used to search for the gesture matching the drawing direction of the locus detected by the direction detection unit from among a plurality of predetermined gestures. The auxiliary information display unit is used to display a search result by the gesture search unit in a screen as auxiliary information each time the drawing direction of the locus is detected by the direction detection unit.

With the configuration described above, the information processing apparatus can detect the moving direction from a locus of gesture input by the user using the direction detection unit and successively narrow down candidates of gesture matching the moving direction thereof using the gesture search unit. Further, the information processing apparatus can successively provide auxiliary information corresponding to candidates of gesture extracted by the narrow-down search using the auxiliary information display unit to the user. As a result, the user can input a gesture correctly while referencing auxiliary information successively displayed in the process of inputting a gesture.

Since the user does not have to remember shapes of gesture correctly, burdens on the user are alleviated. Further, gestures are input correctly, so that recognition precision of gestures is improved. As a result, gestures having complex shapes can be defined. Thus, gestures in shapes from which the user can easily recollect applications or display information can be defined. With gestures defined in manners described above, the user can easily remember correspondence between gestures and operation results and the like, leasing to smooth gesture input and a reduced time before an operation result being obtained.

The auxiliary information display unit may be configured to display complete pictures of the predetermined gestures extracted by a search of the gesture search unit as the auxiliary information. Since it becomes possible, as described above, to define shapes of gesture by associating with application functions, operation results, or display content, the user can easily input gestures only by displaying complete pictures of gestures defined in a way described above as auxiliary information. If such auxiliary information is displayed, first, the user can easily determine a desired gesture from the whole shape of gesture. Next, the user can easily recognize the direction in which to move from the whole shape of gesture. As a result, the user can swiftly determine the direction in which to be input next.

The gesture search unit may be configured to search for the gesture matching the direction of the locus from among the predetermined gestures associated with an application related to display information in the screen. In most cases, the user desires to activate an application related to content displayed in the screen. Thus, candidates of gestures matching the direction of an input locus are preferentially extracted from among gestures associated with the application related to display information. With this configuration, the user will be able to obtain a desired operation result more quickly.

The information processing apparatus may further include an application activation unit that activates the application associated with the predetermined gesture when the complete picture of the predetermined gesture displayed by the auxiliary information display unit is selected. With this configuration, a desired gesture can directly be selected from among candidates of gestures narrow-down searched based on the direction of a locus input by the user. Since it becomes possible, as described above, to define shapes of gesture in such a way that operation results and the like are recollected, the user can easily find a desired gesture after candidates of gestures displayed after being narrowed down are displayed. If, at this point, the information processing apparatus is configured to be able to activate an application by the user, the user will be able to obtain a desired operation result more quickly.

The auxiliary information display unit may be configured to display only a partial locus (next and subsequent moving directions) as the auxiliary information following an end edge of the locus of the complete picture of the predetermined gesture extracted by a search of the gesture search unit. As a partial locus following an end edge of the locus, for example, it is necessary to show only the moving direction corresponding to the operation step to be input next by the user. By adopting the display such as described above, the user will be able to input gestures correctly by following auxiliary information successively displayed even if the user does not remember shapes of gestures correctly. Further, when compared with a case in which the whole shape of a gesture is displayed, the display area can be reduced so that even if the display screen is small, the whole display region will be used efficiently.

The auxiliary information display unit may be configured to display, as the auxiliary information, information about an application corresponding to the predetermined gesture extracted by the search of the gesture search unit by associating with the partial locus displayed as the auxiliary information. If only a partial locus is displayed as auxiliary information, it is preferable that operation results and the like obtained as a result of input according to the auxiliary information be presented to the user. With this configuration, when a partial locus corresponding to a desired gesture is selected from a plurality of displayed partial loci, the user can reference displayed auxiliary information.

It should be understood by those skilled in the art that various modifications, combinations, sub-combinations and alterations may occur depending on design and other factors insofar as they are within the scope of the appended claims or the equivalents thereof.

The present application contains subjected matter related to that disclosed in Japanese Priority Patent Application JP 2008-172407 filed in the Japan Patent Office on Jul. 1, 2008, the entire contents of which is hereby incorporated by reference.

What is claimed is:

1. An information processing apparatus, comprising:
   a direction detection unit that detects a drawing direction of a locus representing an incomplete gesture drawn in an input process;
   a gesture search unit that searches for a plurality of gestures matching the incomplete gesture based on the drawing direction of the locus detected by the direction detection unit from among a plurality of predetermined gestures; and
   an auxiliary information display unit that displays, as a search result, the plurality of gestures matching the incomplete gesture by the gesture search unit in a screen each time the drawing direction of the locus is detected by the direction detection unit, each of the plurality of gestures being selectable to perform a completed gesture:
   wherein the auxiliary information display unit displays a next movement direction corresponding to one or more of the plurality of gestures extracted by the gesture search unit.

2. The information processing apparatus according to claim 1, wherein the auxiliary information display unit displays complete pictures of the plurality of gestures extracted by a search of the gesture search unit.

3. The information processing apparatus according to claim 2, wherein the gesture search unit:
   determines functionality of an application associated with display information displayed by a display unit; and
   searches for gestures corresponding to the determined functionality and matching the drawing direction of the locus from among the predetermined gestures.

4. The information processing apparatus according to claim 2, further comprising an application activation unit that activates an application associated with the completed gesture when a complete picture of the plurality of gestures displayed by the auxiliary information display unit is selected.

5. The information processing apparatus according to claim 1, wherein the auxiliary information display unit displays information about an application corresponding to the one or more of the plurality of gestures extracted by the gesture search unit.

6. A method for displaying auxiliary information, comprising the steps of:
   detecting a drawing direction of a locus representing an incomplete gesture drawn in an input process;
   searching for a plurality of gestures matching the incomplete gesture based on the drawing direction of the locus from among a plurality of predetermined gestures;
   displaying, as a search result, the plurality of gestures matching the incomplete gesture each time the drawing direction of the locus is detected, each of the plurality of gestures being selectable to perform a completed gesture; and
   displaying a next movement direction corresponding to one or more of the plurality of matching gestures.

* * * * *